United States Patent
Hwang et al.

(10) Patent No.: US 10,506,213 B2
(45) Date of Patent: Dec. 10, 2019

(54) METHOD AND APPARATUS FOR CALIBRATING IMAGE

(71) Applicant: Samsung Electronics Co., Ltd., Suwon-si, Gyeonggi-do (KR)

(72) Inventors: Hyoseok Hwang, Seoul (KR); Yang Ho Cho, Seongnam-si (KR); Dong Kyung Nam, Yongin-si (KR); Ouk Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 392 days.

(21) Appl. No.: 14/932,405

(22) Filed: Nov. 4, 2015

(65) Prior Publication Data

US 2016/0150211 A1 May 26, 2016

(30) Foreign Application Priority Data

Nov. 20, 2014 (KR) .................. 10-2014-0162651

(51) Int. Cl.
*H04N 13/00* (2018.01)
*H04N 13/133* (2018.01)
(Continued)

(52) U.S. Cl.
CPC ......... *H04N 13/133* (2018.05); *G06T 3/0093* (2013.01); *G06T 7/33* (2017.01); *H04N 13/128* (2018.05); *H04N 13/246* (2018.05); *H04N 13/25* (2018.05); *H04N 13/257* (2018.05); *G06T 2207/10012* (2013.01); *G06T 2207/10024* (2013.01); *G06T 2207/20024* (2013.01)

(58) Field of Classification Search
CPC ......... G06T 3/0093; G06T 2207/10024; G06T 2207/20024; G06T 2207/10012; G06T 7/33; H04N 13/025; H04N 13/0257; H04N 13/0025; H04N 13/0246; H04N 13/0022

See application file for complete search history.

(56) References Cited

U.S. PATENT DOCUMENTS

2004/0213452 A1   10/2004   Seo et al.
2008/0002879 A1   1/2008    Jeon et al.
(Continued)

FOREIGN PATENT DOCUMENTS

CN   102243764 A   11/2011
CN   102404595 A   4/2012
(Continued)

OTHER PUBLICATIONS

European Search Report dated May 11, 2016 issued in corresponding EP Application No. 15194812.2.
(Continued)

*Primary Examiner* — Zhihan Zhou
(74) *Attorney, Agent, or Firm* — Harness, Dickey & Pierce, P.L.C.

(57) ABSTRACT

An apparatus for calibrating a multiview image may extract feature points from the multiview image and perform image calibration based on the extracted feature points, track corresponding feature points in temporally successive image frames of a first view image, and perform the image calibration based on pairs of corresponding feature points between the feature points tracked from the first view image and feature points of a second view image.

25 Claims, 9 Drawing Sheets

(51) Int. Cl.
*H04N 13/246* (2018.01)
*H04N 13/25* (2018.01)
*H04N 13/257* (2018.01)
*G06T 3/00* (2006.01)
*G06T 7/33* (2017.01)
*H04N 13/128* (2018.01)

(56) References Cited

U.S. PATENT DOCUMENTS

| | | | |
|---|---|---|---|
| 2010/0104184 A1 | 4/2010 | Bronstein et al. | |
| 2012/1024280 | 9/2012 | Ibrahim et al. | |
| 2012/0249536 A1* | 10/2012 | Sutou | H04N 13/0011 345/419 |
| 2012/0262543 A1* | 10/2012 | Lee | H04N 13/026 348/43 |
| 2012/0263373 A1 | 10/2012 | Walter et al. | |
| 2012/0281146 A1* | 11/2012 | Yamada | H04N 5/23254 348/607 |
| 2012/0314933 A1* | 12/2012 | Morifuji | H04N 13/0022 382/154 |
| 2013/0004079 A1* | 1/2013 | Yamada | G06K 9/4642 382/190 |
| 2013/0057644 A1* | 3/2013 | Stefanoski | G06T 5/50 348/42 |
| 2013/0057658 A1 | 3/2013 | Allezard et al. | |
| 2013/0076862 A1* | 3/2013 | Ohtomo | G01C 11/025 348/46 |
| 2013/0129191 A1 | 5/2013 | Jin et al. | |
| 2013/0229485 A1* | 9/2013 | Rusanovskyy | H04N 13/0048 348/43 |
| 2014/0009586 A1* | 1/2014 | McNamer | H04N 13/021 348/50 |
| 2014/0111605 A1* | 4/2014 | Guo | G06T 3/4038 348/36 |
| 2014/0118402 A1* | 5/2014 | Gallo | G06T 5/50 345/646 |
| 2014/0125660 A1* | 5/2014 | Redmann | G06T 3/40 345/419 |
| 2014/0161347 A1* | 6/2014 | Stauder | G06K 9/4652 382/154 |
| 2016/0142627 A1* | 5/2016 | Chou | G06T 7/593 348/240.2 |
| 2017/0019616 A1* | 1/2017 | Zhu | H04N 5/341 |

FOREIGN PATENT DOCUMENTS

| | | |
|---|---|---|
| CN | 102435172 A | 5/2012 |
| CN | 102714697 A | 10/2012 |
| CN | 102821291 A | 12/2012 |
| CN | 102859555 A | 1/2013 |
| CN | 103020945 A | 4/2013 |
| CN | 103033169 A | 4/2013 |
| JP | 2003-323603 A | 11/2003 |
| JP | 2013-516001 A | 5/2013 |
| KR | 2012-0011529 A | 2/2012 |
| KR | 2013-0112133 A | 10/2013 |

OTHER PUBLICATIONS

Office Action for Corresponding Chinese Patent Application No. 201510810364.0 dated Nov. 23, 2017 and English translation thereof.
Julian Mason et al,, "Object Disappearance for Object Discovery", IEEE/RSJ International Conference on Intelligent Robots and Systems, Oct. 7-12, 2012.
European Office Action dated Nov. 19, 2018 for corresponding European Application No. 15194812.2.
Office Action for corresponding Chinese Patent Application No. 201510810364.0 dated Dec. 6, 2018 and English translation thereof.

* cited by examiner

METHOD AND APPARATUS FOR CALIBRATING IMAGE

CROSS-REFERENCE TO RELATED APPLICATION

This application claims the priority benefit of Korean Patent Application No. 10-2014-0162651, filed on Nov. 20, 2014, in the Korean Intellectual Property Office, the entire contents of which are incorporated herein by reference in its entirety.

BACKGROUND

1. Field

At least one example embodiment relates to a method and/or an apparatus for calibrating a multiview image.

2. Description of the Related Art

In general, a three-dimensional (3D) display apparatus that displays a 3D image may use a method of generating multiview images from a stereo image including a left view image and a right view image to generate images to be displayed. In such a method through which the multiview images are generated, a depth image may be generated based on the left view image and the right view image, and image rectification may be performed to equalize height values of all corresponding pixels between the left view image and the right view image. In general, epipolar geometry based image rectification may be applied to adjust a height difference between the left view image and the right view image.

SUMMARY

At least one example embodiment relates to a method of calibrating an image.

According to at least one example embodiment, the method may include extracting a feature point from a multiview image including a first view image and a second view image, selecting first feature points corresponding to feature points of a preceding image frame from among feature points included in a current image frame of the first view image, selecting second feature points corresponding to feature points included in a current image frame of the second view image from among the first feature points, and performing image calibration on the current image frame of the second view image based on the second feature points.

The selecting of the first feature points may include determining pairs of corresponding feature points between the current image frame and the preceding image frame of the first view image, and selecting the first feature points from among the pairs of the feature points using a fundamental matrix between the current image frame and the preceding image frame of the first view image.

The selecting of the first feature points may include randomly selecting a number of pairs of feature points from among the selected pairs of the feature points, and determining the fundamental matrix based on location information of the selected pairs of the feature points.

The performing of the image calibration may include performing the image calibration on the current image frame of the second view image based on the second feature points and third feature points of the current image frame of the second view image corresponding to the second feature points.

The performing of the image calibration may include determining a homography between the current image frame of the first view image and the current image frame of the second view image based on location information of the second feature points and location information of the third feature points, and adjusting locations of pixels included in the current image frame of the second view image by applying the homography to the current image frame of the second view image.

The performing of the image calibration may include filtering the second feature points and the third feature points based on a search region, and performing the image calibration on the current image frame of the second view image based on remaining second feature points and remaining third feature points through the filtering.

The method may further include adjusting color values of pixels included in the current image frame of the second view image based on a homography between the current image frame of the first view image and the current image frame of the second view image.

The adjusting of the color values may include warping the current image frame of the second view image using the homography, mapping the warped current image frame of the second view image to the current image frame of the first view image, identifying corresponding pixels in the current image frame of the second view image and the current image frame of the first view image mapped with the current image frame of the second view image, determining a color transform matrix based on color values of the identified pixels, and adjusting the color values of the pixels included in the current image frame of the second view image by applying the color transform matrix to the current image frame of the second view image.

The extracting of the feature point may include downsampling the current image frame of the first view image, and extracting a feature point from the downsampled current image frame.

Other example embodiments relate to an apparatus for calibrating an image.

According to at least one example embodiment, the apparatus may include a feature point extractor configured to extract a feature point from a multiview image including a first view image and a second view image, a feature point determiner configured to select feature points to be used for image calibration from a current image frame of the first view image and a current image frame of the second view image based on feature points included in a preceding image frame of the first view image, and an image calibrator configured to perform the image calibration based on the selected feature points.

The image calibrator may include a geometric calibrator configured to adjust locations of pixels included in the current image frame of the second view image based on location information of the feature points to be used for the image calibration.

The image calibrator may include a color corrector configured to adjust color values of pixels included in the current image frame of the second view image based on a homography between the current image frame of the first view image and the current image frame of the second view image.

The color corrector may determine a color transform matrix based on the homography, and adjust color values of pixels included in a current image frame of a different view image by applying the color transform matrix to the current image frame of the second view image.

According to at least one example embodiment, an apparatus for calibrating a multiview image including a first view image and a second view image includes a feature point determiner configured to perform a first filtering operation on a current frame of the first view image by matching feature points of the current frame of first view image with feature points of a preceding frame of the first view image to generate first matched feature points. The feature point determiner is configured to perform a second filtering operation on a current frame of the second view image by matching the first matched feature points with feature points of the current frame of the second view image to generate second matched feature points. The apparatus includes an image calibrator configured to calibrate the multiview image based on the second matched feature points.

According to at least one example embodiment, the feature point determiner is configured to perform the matching in the first filtering operation by determining pairs of feature points between the current frame of the first view image and the preceding frame of the first view image, and selecting feature points from the pairs of feature points using a fundamental matrix between the current frame of the first view image and the preceding frame of the first view image.

According to at least one example embodiment, the image calibrator includes a geometric calibrator configured to adjust locations of pixels in the current frame of the second view image based on location information of the second matched feature points.

According to at least one example embodiment, the geometric calibrator is configured to determine a homography between the current frame of the first view image and the current frame of the second view image based on the location information of the second matched feature points, and adjust the locations of the pixels in the current frame of the second view image using the homography.

According to at least one example embodiment, the image calibrator includes a color corrector configured to adjust color values of pixels in the current frame of the second view image based on a homography between the current frame of the first view image and the current frame of the second view image.

According to at least one example embodiment, the color corrector is configured to determine a color transform matrix based on the homography, and adjust color values of pixels in the current frame of the second view image using the color transform matrix.

According to at least one example embodiment, an apparatus for calibrating a multiview image including a first view image and a second view image includes a feature point extractor configured to extract feature points from a current frame of the first view image. The apparatus may include a feature point determiner configured to determine pairs of corresponding feature points between the extracted feature points and initial feature points of a preceding frame of the first view image, generate a fundamental matrix using the pairs of corresponding feature points, and determine whether a scene change has occurred between the preceding frame of the first view image and the current frame of the first view image based on the fundamental matrix and a condition.

According to at least one example embodiment, the feature point determiner is configured to determine the pairs of corresponding feature points by matching the extracted feature points with the initial feature points based on distances between coordinates of the extracted feature points and coordinates of the initial feature points to generate pairs of matched feature points, and generating the pairs of corresponding feature points using the pairs of matched feature points that have a distance value that is less than or equal to a threshold value.

According to at least one example embodiment, the feature point determiner is configured to generate the fundamental matrix by randomly extracting a number of the pairs of corresponding feature points, and generating the fundamental matrix using location information of the extracted number of the pairs of corresponding feature points.

According to at least one example embodiment, the apparatus includes an image calibrator configured to calibrate the multiview image using the pairs of corresponding feature points if the scene change has not occurred, and calibrate the multiview image without using the pairs of corresponding feature points if the scene change has occurred.

According to at least one example embodiment, the feature point determiner is configured to divide the current frame of the first view image into search regions that include the extracted feature points, and reduce a number of the extracted feature points by selecting, in each of the search regions, an extracted feature point that has a greatest score, the score indicating a probability that the extracted feature point is in the pairs of corresponding feature points.

According to at least one example embodiment, an apparatus for calibrating a multiview image including a first view image and a second view image includes a feature point determiner configured select first feature points, corresponding to feature points of a preceding image frame of a first view image, from among extracted feature points in a current image frame of the first view image. The feature point determiner is configured to select second feature points, corresponding to feature points in a current image frame of the second view image, from among the first feature points. The apparatus includes an image calibrator configured to perform image calibration on the current image frame of the second view image based on the second feature points.

According to at least one example embodiment, the feature point determiner is configured to select the first feature points by determining pairs of corresponding feature points between the current image frame of the first view image and the preceding image frame of the first view image, and selecting the first feature points from among the pairs of the feature points using a fundamental matrix between the current image frame of the first view image and the preceding image frame of the first view image.

According to at least one example embodiment, the feature point determiner is configured to select the first feature points by randomly selecting a number of pairs of feature points from among the selected pairs of the feature points, and determining the fundamental matrix based on location information of the selected number of pairs of the feature points.

According to at least one example embodiment, the feature point determiner is configured to select the pairs of the feature points by determining the pairs of the feature points based on a difference in a feature point descriptor indicating a neighborhood property of a feature point.

According to at least one example embodiment, the image calibrator is configured to perform the image calibration on the current image frame of the second view image based on the second feature points and third feature points of the current image frame of the second view image corresponding to the second feature points.

According to at least one example embodiment, the image calibrator is configured to perform of the image calibration by determining a homography between the current image frame of the first view image and the current image frame of the second view image based on location information of the second feature points and location information of the third feature points, and adjusting locations of pixels in the current image frame of the second view image by applying the homography to the current image frame of the second view image.

According to at least one example embodiment, the image calibrator is configured to perform the image calibration by filtering the second feature points based on a search region; and performing the image calibration on the current image frame of the second view image based on ones of the second feature points remaining after the filtering.

According to at least one example embodiment, the image calibrator is configured to perform the image calibration by adjusting vertical coordinate values of pixels in the current image frame of the second view image based on location information of the second feature points and location information of the third feature points.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
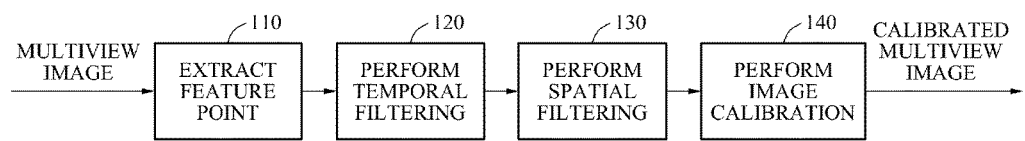
FIG. 1 is a diagram illustrating an overall operation of an apparatus for calibrating an image according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an overall operation of an apparatus for calibrating an image according to at least one example embodiment.

Referring to FIG. 1, the apparatus for calibrating an image, hereinafter referred to as an image calibrating apparatus, may calibrate a multiview image. The multiview image may refer to an image in which images obtained by capturing an object at different viewpoints or angles are combined. A stereo image including double view images including a left view image and a right view image may be an example of the multiview image. As another example, the multiview image may include at least three view images. The multiview image may be provided to the image calibrating apparatus from an external source such as, for example, a broadcasting station and a web server, an internal and external storage medium, and a playback device. Each view image included in the multiview image may include a plurality of temporally successive image frames.

For ease of description, the overall operation of the image calibrating apparatus will be described based on a first view image and a second view image included in such a multiview image. The second view image may refer to an image captured at a different viewpoint from the first view image. For example, the first view image may be the left view image and the second view image may be the right view image. Conversely, the first view image may be the right view image and the second view image may be the left view image. The following descriptions may be applicable to a multiview image including at least three view images in addition to the multiview image including the first view image and the second view image.

The image calibrating apparatus may adjust a difference in a height and/or a color among a plurality of images included in a multiview image. For example, the image calibrating apparatus may adjust a height of the second view image for the first view image and the second view image to have a desired (or alternatively, minimum) height difference. In addition, the image calibrating apparatus may adjust a color value of the second view image for the first view image and the second view image to have a desired (or alternatively, similar) color characteristic. The image calibrating apparatus may perform image calibration to adjust a height or a color of an image based on feature points extracted from a multiview image.

The image calibrating apparatus may select feature points to be used for the image calibration including height adjustment and/or color correction by filtering the feature points extracted from the multiview image. The image calibrating apparatus may track feature points in temporally successive image frames of a certain view image, and select the feature points to be used for the image calibration by performing feature point matching between different view images. For example, the image calibrating apparatus may track feature points in temporally successive image frames of the first view image, and determine pairs of feature points between the first view image and the second view image based on the feature points tracked from the first view image.

Here, determining pairs of corresponding feature points between a preceding image frame and a current image frame of the first view image may be referred to as temporal filtering or temporal matching, and determining pairs of corresponding feature points between the current image frame of the first view image and a current image frame of the second view image may be referred to as spatial filtering or spatial matching.

As illustrated in FIG. 1, in operation 110, the image calibrating apparatus (e.g., image calibrating apparatus 300 in FIG. 3) extracts a feature point from a multiview image in response to an input of the multiview image to the image calibrating apparatus. For example, the image calibrating apparatus may extract, as a feature point, an edge region and/or a corner region based on pixel value distribution of a view image. For example, the image calibrating apparatus may extract the feature point from the multiview image using a Harris corner method, a scale invariant feature transform (SIFT) method, and/or a feature from accelerated segment test (FAST) method.

In operation 120, the image calibrating apparatus performs the temporal filtering on feature points extracted from the multiview image. The image calibrating apparatus may track corresponding feature points in temporally successive image frames of a view image. For example, the image calibrating apparatus may select corresponding feature points from among feature points of the preceding image frame of the first view image and feature points of the current image frame of the first view image. The preceding image frame may refer to an image frame captured prior to the current image frame in terms of time. Among feature points extracted from the current image frame of the first view image, feature points that do not correspond to the feature points of the preceding image frame may be filtered out and excluded from the selecting of the feature points. Through the temporal filtering, the feature points of the current image frame may be filtered out based on the feature points used for the image calibration among the feature points of the preceding image frame. The temporal filtering may minimize an occurrence of flickering caused by different shapes of resulting images for each temporally different image frame after image rectification.

In operation 130, the image calibrating apparatus performs the spatial filtering on the feature points on which the temporal filtering is performed. The image calibrating apparatus may re-filter feature points included in a different view image among feature points remaining subsequent to the filtering in successive image frames of a certain view image. The temporal filtering may be an operation of determining corresponding feature points in one view image based on a time axis, the spatial filtering may be an operation of determining corresponding feature points in different view images based on space.

For example, the image calibrating apparatus may select feature points corresponding to the feature points of the current image frame of the second view image from among feature points remained in the current image frame of the first view image after the temporal filtering is performed. Among the feature points included in the current image frame of the first view image, feature points that do not correspond to the feature points of the current image frame of the second view image may be filtered out and excluded from the selecting of the feature points. The feature points to be used for the image calibration may be determined subsequent to the temporal filtering and the spatial filtering.

In operation 140, the image calibrating apparatus may perform the image calibration based on the feature points determined through the temporal filtering and the spatial filtering. The image calibrating apparatus may perform distortion-free geometric calibration and/or color correction based on the feature points of the multiview image determined through the temporal filtering and the spatial filtering.

After both the temporal filtering and the spatial filtering are performed, when the feature points selected from the current image frame of the first view are referred to as first reference feature points, and feature points corresponding to the first reference feature points among the feature points included in the current image frame of the second view image are referred to as second reference feature points, the image calibrating apparatus may perform the image calibration to minimize a vertical disparity and/or a color disparity between the first view image and the second view image based on such reference feature points.

For example, the image calibrating apparatus may adjust heights of pixels included in the second view image based on a location relationship between the first reference feature points and the second reference feature points, and the vertical disparity between the first view image and the second view image may be reduced (or alternatively, minimized) through the adjusting. In addition, the image calibrating apparatus may adjust a brightness and/or a color of the second view image using color information of the first reference feature points and the second reference feature points, and a brightness disparity and/or the color disparity between the first view image and the second view image may be reduced (or alternatively, minimized) through the adjusting.

The multiview image calibrated by the image calibrating apparatus may be used to generate three-dimensional (3D) contents such as a stereoscopic image. A depth image including distance information on a distance to an object may be generated based on the calibrated multiview image, and the 3D contents providing viewers with a 3D effect may be generated using the depth image.

Figure 2:
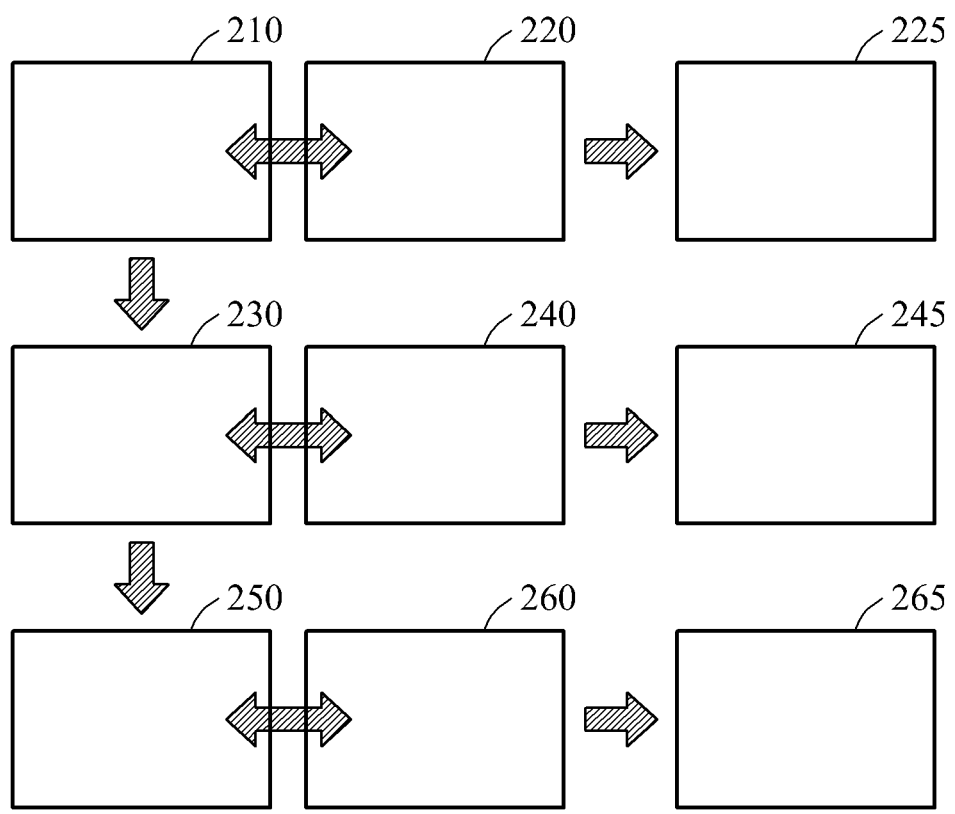
FIG. 2 illustrates an example of an operation of performing image calibration by an apparatus for calibrating an image based on a first view image and a second view image according to at least one example embodiment.

FIG. 2 illustrates an example of an operation of performing image calibration by an image calibrating apparatus based on a first view image and a second view image according to at least one example embodiment.

Referring to FIG. 2, image frames, for example, an image frame 210, an image frame 230, and an image frame 250, indicate temporally successive image frames in the first view image. Similarly, image frames, for example, an image frame 220, an image frame 240, and an image frame 260, indicate temporally successive image frames in the second view image. Image frames, for example, an image frame 225, an image frame 245, and an image frame 265, indicate image frames obtained through the image calibration performed by the image calibrating apparatus on the image frame 220, the image frame 240, and the image frame 260, respectively.

The image frames 210, 220, 230, 240, 250, and 260 illustrated in FIG. 2 may indicate image frames captured in a time section of a total time section. The image frames 210 and 220 may be captured first and the image frames 250 and 260 may be captured last chronologically among all the image frames illustrated in FIG. 2. The image frames 230 and 240 may be captured between the image frames 210 and 220 and the image frames 250 and 260. The image calibrating apparatus may extract feature points from each of the image frames 210, 220, 230, 240, 250, and 260, and perform the image calibration based on the extracted feature points.

An operation of performing the image calibration by the image calibrating apparatus using the image frame 230 and the image frame 240 will be described hereinafter.

The image calibrating apparatus may select first feature points corresponding to feature points of the image frame 210, which is a preceding image frame of the image frame 230, from among feature points extracted from the image frame 230. The image calibrating apparatus may determine whether feature point tracking between the image frame 210 and the image frame 230 is successful based on a number of the first feature points selected from the image frame 230. For example, when the number of the first feature points selected from the image frame 230 is greater than a desired (or alternatively, predetermined) number, the image calibrating apparatus may determine the feature point tracking between the image frame 210 and the image frame 230 to be successful. However, when the number of the first feature points selected from the image frame 230 is less than or equal to the desired (or alternatively, predetermined) number, the image calibrating apparatus may determine the feature point tracking between the image frame 210 and the image frame 230 to be a failure.

When the feature point tracking between the image frame 210 and the image frame 230 is determined to be successful, the image calibrating apparatus may select second feature points corresponding to feature points included in the image frame 240 of the second view image from among the first feature points selected from the image frame 230. For example, when the number of the feature points extracted from the image frame 230 is 100, the number of the first feature points may be determined to be less than or equal to 100 and the number of the second feature points may be determined to be less than or equal to the determined number of the first feature points. Since feature points not to be used for the image calibration among all feature points extracted from an image frame may be filtered out based on feature points of a preceding image frame and feature points of a different view image frame, the preceding events may occur.

After both temporal filtering and spatial filtering are performed, the second feature points selected from the image frame 230 of the first view image may indicate first reference feature points to be used for the image calibration. Third feature points corresponding to the first reference feature points of the image frame 230 among the feature points included in the image frame 240 of the second view image may indicate second reference feature points to be used for the image calibration.

The image calibrating apparatus may calibrate the image frame 240 of the second view image based on the first reference feature points selected from the image frame 230 of the first view image. The image calibrating apparatus may perform geometric calibration on the image frame 240 based on location information of the first reference feature points and location information of the second reference feature points corresponding to the first reference feature points of the image frame 230 among the feature points extracted from the image frame 240. For example, the image calibrating apparatus may determine a homography between the image frame 230 and the image frame 240 based on the location information of the first reference feature points and the location information of the second reference feature points, and adjust locations of pixels included in the image frame 240 by applying the homography to the image frame 240 to reduce a vertical disparity between the image frame 230 and the image frame 240.

The image calibrating apparatus may additionally perform color correction on the image frame 240 on which the geometric calibration is performed based on color information of the first reference feature points and color information of the second reference feature points. For example, the image calibrating apparatus may determine a color transform matrix based on the color information of the first reference feature points and the color information of the second reference feature points, and adjust a brightness and/or a color of the image frame 240 by applying the color transform matrix to the image frame 240. After the image calibration is performed, the image frame 245 obtained by performing the image calibration on the image frame 240 may be generated, and 3D contents may be generated based on the image frame 230 and the image frame 245.

When the feature point tracking between the image frame 210 and the image frame 230 is determined to be a failure, the image calibrating apparatus may determine that a scene change occurs in the image frame 230. The scene change may indicate that succession of scenes in image frames is broken in a certain image frame and a scene is changed to a different scene. When the scene change occurs, the image calibrating apparatus may perform the image calibration by performing the spatial filtering between the image frame 230 and the image frame 240 without performing the temporal filtering. For example, the image calibrating apparatus may perform the image calibration on the image frame 240 based on pairs of corresponding feature points between the image frame 230 and the image frame 240 without using the feature points of the image frame 210.

In the case of the image frame 250, which is an image frame in a subsequent time section of the image frame 230, the image calibrating apparatus may perform feature point tracking between the image frame 230 and the image frame 250, and determine whether the feature point tracking is successful. For example, when a number of pairs of corresponding feature points between the image frame 230 and the image frame 250 is greater than a desired (or alternatively, predetermined) number, the image calibrating apparatus may determine the feature point tracking between the image frame 230 and the image frame 250 to be successful.

When the feature point tracking between the image frame 230 and the image frame 250 is determined to be successful, the first reference feature points of the image frame 230 used to calibrate the image frame 240 may be used to calibrate the image frame 250 in the subsequent time section. The image calibrating apparatus may perform the temporal filtering based on pairs of corresponding feature points between the first reference feature points of the image frame 230 and feature points of the image frame 250, and calibrate the image frame 260 based on feature points remained after the spatial filtering is performed based on feature points of the image frame 260 among feature points remained after the temporal filtering is performed.

When the feature point tracking between the image frame 230 and the image frame 250 is determined to be a failure, the image calibrating apparatus may determine that a scene change occurs in the image frame 250. When the scene change is determined to occur in the image frame 250, the image calibrating apparatus may calibrate the image frame 260 based on pairs of corresponding feature points between the image frame 250 and the image frame 260 without using the feature points of the image frame 230.

Figure 3:
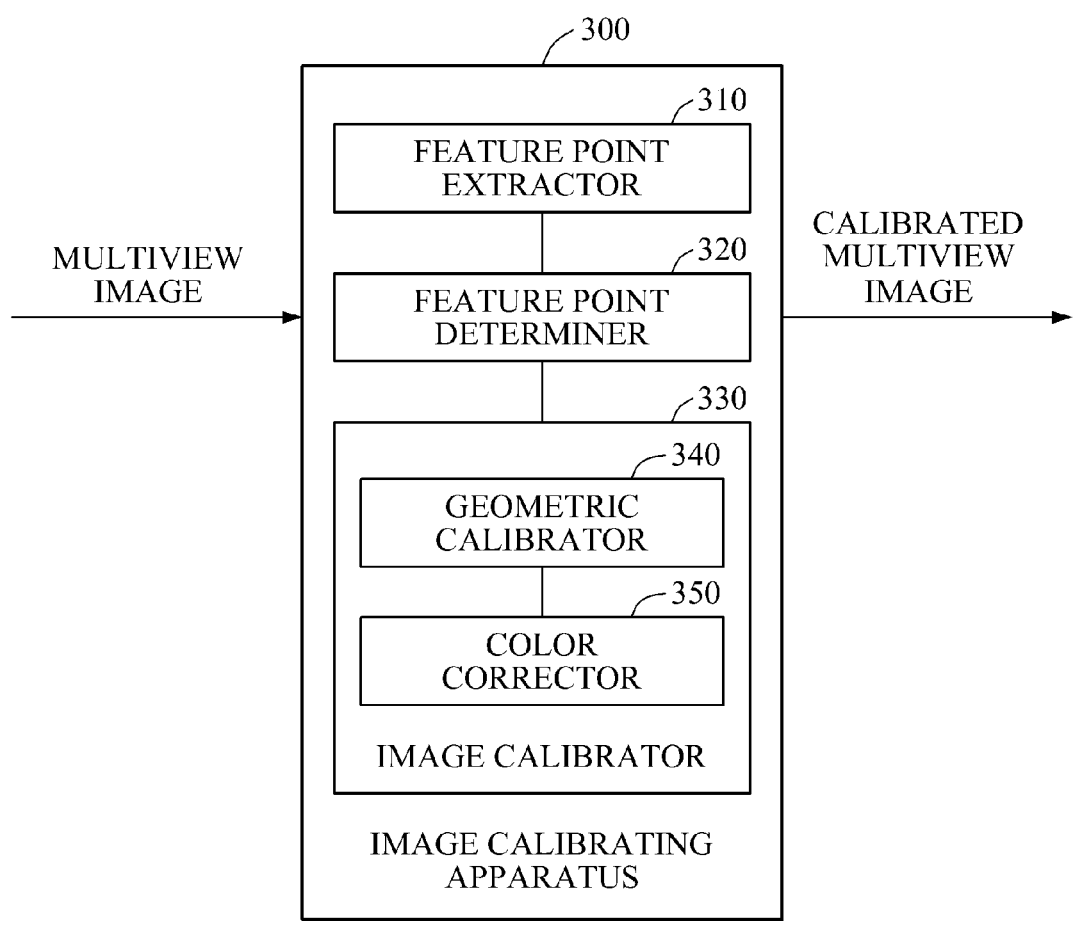
FIG. 3 is a diagram illustrating a configuration of an apparatus for calibrating an image according to at least one example embodiment.

FIG. 3 is a diagram illustrating a configuration of an image calibrating apparatus 300 according to at least one example embodiment. Referring to FIG. 3, the image calibrating apparatus 300 includes a feature point extractor 310, a feature point determiner 320, and an image calibrator 330. It should be understood that the image calibrating apparatus 300 may be included in any display device that processes multiview images. For example, the image calibrating apparatus 300 may be incorporated into a three-dimensional TV, a video player, a set-top box, or a dongle connected between a video source and a display. The image calibrating apparatus 300 may also be included in a head-mounted display (HMD).

A multiview image may be transmitted as an input image to the image calibrating apparatus 300, and the feature point extractor 310 may extract a feature point from the multiview image. The feature point extractor 310 may extract an edge region or a corner region as the feature point from the multiview image. For example, the feature point extractor 310 may extract the feature point from the multiview image using a Harris corner method, a SIFT method, and/or a FAST method.

Alternatively, the feature point extractor 310 may selectively perform downsampling on the multiview image based on a size of the multiview image. For example, when the size of the multiview image is greater than a desired (or alternatively, predetermined) size, the feature point extractor 310 may reduce the size of the multiview image by downsampling the multiview image, and extract the feature point from the reduced multiview image. Subsequently, the feature point extractor 310 may determine a location of the feature point in the multiview image of an original size by applying, the location of the extracted feature point, a scale value applied to the downsampling. Extracting the feature point from the downsampled multiview image may reduce an amount of processing time.

The feature point determiner 320 may select feature points to be used for image calibration from among feature points extracted from the multiview image. The feature point determiner 320 may select the feature points to be used for the image calibration from among feature points included in a current image frame (or current frame) of a first view image and a current image frame (or current frame) of a second view image based on feature points included in a preceding image frame (or preceding frame) of the first view image.

The feature point determiner 320 may track corresponding feature points in successive image frames of the first view image, and detect whether a scene change occurs. When the tracking of the feature points in the successive image frames of the first view image is determined to be a failure, the feature point determiner 320 may determine that the scene change occurs. The feature point determiner 320 may determine whether the tracking of the feature points is successful using a fundamental matrix representing a geometric relationship between actual pixel coordinates of the preceding image frame and the current image frame of the first view image. For example, when a number of pairs of corresponding feature points between the preceding image frame and the current image frame of the first view image is less than or equal to a desired (or alternatively, predetermined) number, the feature point determiner 320 may determine that the scene change occurs in the current image frame.

When the scene change is determined to occur, the feature point determiner 320 may determine the feature points to be used for the image calibration by performing spatial filtering without performing temporal filtering. For example, when the scene change occurs in the current image frame, the feature point determiner 320 may determine pairs of corresponding feature points between the current image frame of the first view image and the current image frame of the second view image without using the feature points included in the preceding image frame of the first view image.

When the scene change is determined not to occur in the current image frame, the feature point determiner 320 may select first feature points corresponding to the feature points of the preceding image frame from among the feature points included in the current image frame of the first view image.

The feature point determiner 320 may configure and manage a feature set including information on feature points based on the feature points tracked between the preceding image frame and the current image frame of the first view image. The feature set may include information on feature points used for the image calibration in the preceding image frame.

The feature point determiner 320 may perform the tracking of the feature points through feature point matching between the preceding image frame and the current image frame of the first view image. The feature point determiner 320 may determine the pairs of the corresponding feature points among the feature points of the preceding image frame and the current image frame of the first view image based on a difference in a feature point descriptor.

Hereinafter, it is assumed that local feature points extracted from the first view image and the second view image by the feature point extractor 310 are SIFT, and each feature point possesses a vector having 128 dimensions as a descriptor. The SIFT may be a feature expressing a local gradient distribution characteristic adjacent to a feature point. A SIFT feature vector may be a 128 dimensional vector obtained by dividing a patch region adjacent to the feature point into 4×4 blocks, determining a histogram associated with a gradient orientation and a gradient magnitude of pixels included in each block, and connecting bin values of the histogram in a line.

For example, it may be assumed that a current image frame of a first view image at a time t is "$I_L^t$," a current image frame of a second view image at the time t is "$I_R^t$," a set of feature points extracted from the current image frame of the first view image is "$F_L^t$," a set of feature points extracted from the current image frame of the second view image is "$F_R^t$," each feature point included in the $F_L^t$ is "$fp_{L,i}^t$," and each feature point included in the $F_R^t$ is "$fp_{R,i}^t$," wherein "i" denotes an index to distinguish feature points and ranges from 1 to N, a number of corresponding feature points, and each feature point has location information (x, y) in an image frame and a score "s." The score may indicate a reliability value for a feature point when the feature point is extracted. In other words, the score may be an indication of the probability that the extracted feature point will be part of a useful pair of corresponding feature points (e.g., that the extracted feature point will be used in a spatial filtering operation).

When a descriptor possessed by a feature point having the index i and included in $f_{L,i}^t$ is "$d_{L,i}^t$," a set "$M_L^t$" of corresponding feature points between a preceding image frame and the current image frame of the first view image may be determined based on Equation 1.

$$(m_{L,i}^{t-1}, m_{L,i}^t) = \arg\min \|m_{L,j}^{t-1} - m_{L,k}^t\| \qquad \text{[Equation 1]}$$

In Equation 1, "$m_{L,i}^t$" denotes feature points included in the current image frame among the corresponding feature points between the preceding image frame and the current image frame of the first view image. "$m_{L,i}^{t-1}$" denotes feature points included in the preceding image frame among the corresponding feature points between the preceding image frame and the current image frame of the first view image. "$m_{L,k}^t$" denotes feature points extracted from the current image frame of the first view image, and "$m_{L,j}^{t-1}$" denotes feature points extracted from the preceding image frame. Here, "i," "j," and "k" denote an index to distinguish each feature point.

Based on Equation 1, a j-th feature point of the preceding frame and a k-th feature point of the current image frame having a smallest value of L2 norm with the j-th feature point may be determined to be a pair of feature points. When a minimum L2 distance value among pairs of feature points determined based on Equation 1 is greater than a desired (or alternatively, predetermined) threshold value, the feature point determiner 320 may exclude the corresponding feature points from the pairs of the feature points. The threshold value may be based on empirical evidence and/or user defined. Here, the L2 distance may be a Euclidean distance that indicates a difference between coordinates of a feature point of the current image frame of the first view image and coordinates of a corresponding feature point of the preceding image frame of the first view image. The difference may be determined by comparing a position (or coordinates) of a feature point of the current image frame of the first view image with a position (or coordinates) of a feature point of the preceding image frame of the first view image.

The feature point determiner 320 may determine a fundamental matrix based on location information of the pairs of the feature points determined to be matched between the preceding image frame and the current image frame of the first view image. For example, the image calibrating apparatus 300 may randomly select a desired (or alternatively, predetermined) number of pairs of feature points from among the pairs of the feature points determined based on an L2 distance value, and determine the fundamental matrix based on the location information of the randomly selected pairs of the feature points.

The feature point determiner 320 may randomly extract eight pairs of feature points from sets of feature points $m_{L,i}^{t-1}$ and $m_{L,i}^{t}$ determined to be matched between the preceding image frame and the current image frame of the first view image. The sets of the feature points $m_{L,i}^{t-1}$ and $m_{L,i}^{t}$ determined to be matched between the preceding image frame and the current image frame may satisfy Equation 2 through epipolar geometry.

$$m_{L,i}^{t-1} F m_{L,i}^{t} = 0 \quad \text{[Equation 2]}$$

In Equation 2, "F" denotes a fundamental matrix, which is a 3×3 matrix having a rank of 2. The feature point determiner 320 may randomly extract the eight pairs of the feature points from the pairs of the corresponding feature points between the preceding image frame and the current image frame, and apply the extracted eight pairs of the feature points to Equation 2. Equation 2 may be expressed as Equation 3 based on location information of the eight pairs of the feature points.

$$\begin{bmatrix} x_1^t x_1^{t-1} & x_1^t y_1^{t-1} & x_1^t & y_1^t x_1^{t-1} & y_1^t y_1^{t-1} & y_1^t & x_1^{t-1} & y_1^{t-1} & 1 \\ \vdots & \vdots & \vdots & \vdots & \vdots & \vdots & \vdots & \vdots & \vdots \\ x_8^t x_8^{t-1} & x_8^t y_8^{t-1} & x_8^t & y_8^t x_8^{t-1} & y_8^t y_8^{t-1} & y_8^t & x_8^{t-1} & y_8^{t-1} & 1 \end{bmatrix} \begin{bmatrix} f_{11} \\ f_{12} \\ f_{13} \\ f_{21} \\ f_{22} \\ f_{23} \\ f_{31} \\ f_{32} \\ f_{33} \end{bmatrix} = 0 \quad \text{[Equation 3]}$$

In Equation 3, "$x_i^t$" and "$y_i^t$" denote x coordinates and y coordinates of a feature point $m_i^t$, respectively "$x_i^{t-1}$" and "$y_i^{t-1}$" denote x coordinates and y coordinates of a feature point $m_i^{t-1}$, respectively. "$f_{11}$" through "$f_{33}$" denote elements of the fundamental matrix F. The feature point determiner 320 may determine the fundamental matrix from Equation 3 using a least-squares method. The feature point determiner 320 may apply the determined fundamental matrix to the pairs of the feature points included in the sets of the feature points $m_{L,i}^{t-1}$ and $m_{L,i}^{t}$ and determine whether a result of the applying satisfies a desired (or alternatively, predetermined) condition (or first condition). The desired (or alternatively, predetermined) condition may be based on empirical evidence and/or user defined. The feature point determiner 320 may randomly extract the eight pairs of the feature points from the sets of the feature points $m_{L,i}^{t-1}$ and $m_{L,i}^{t}$ and determine whether the fundamental matrix determined based on location information of the extracted pairs of the feature points satisfies the desired (or alternatively, predetermined) condition. Such operations may be repetitively performed.

For example, the feature point determiner 320 may determine a Sampson distance using the fundamental matrix determined based on Equation 3 and the sets of the feature points $m_{L,i}^{t-1}$ and $m_{L,i}^{t}$, and determine a feature point with less than or equal to 0.5 pixel of the Sampson distance to be an inlier. When an inlier ratio is greater than or equal to 99% (e.g., a first condition), the feature point determiner 320 may determine the fundamental matrix to be a final fundamental matrix. When the inlier ratio is less than 99%, the feature point determiner 320 may randomly extract eight pairs of feature points from the sets of the feature points $m_{L,i}^{t-1}$ and $m_{L,i}^{t}$ until a desired (or alternatively, predetermined) number of repetition times, for example, 10,000 times, is reached, determine a fundamental matrix based on Equation 3 and the location information of the extracted pairs of the feature points, and determine whether the determined fundamental matrix satisfies the desired (or alternatively, predetermined) condition. Such operations may be repetitively performed.

When a number of repetition times is greater than or equal to a desired (or alternatively, predetermined) number of repetition times, and a highest inlier ratio exceeds 20% (or a second condition), the feature point determiner 320 may determine that tracking of feature points between the preceding image frame and the current image frame of the first view image is successful. When the inlier ratio is less than or equal to 20%, the feature point determiner 320 may determine the tracking of the feature points to be a failure.

When the tracking of the feature points is determined to be a failure, it is highly likely that the current image frame is a first image frame or a scene change occurs in the current image frame. When the scene change occurs, intrinsic and extrinsic parameters of cameras may be changed and thus, performing the image calibration may be desired. When the tracking of the feature points between the preceding image frame and the current image frame of the first view image is determined to be a failure, the image calibrating apparatus 300 does not apply a result of the tracking of the feature points between the preceding image frame and the current image frame, but performs the image calibration using a result of matching feature points between the current image frame of the first view image and the current image frame of the second view image.

When the tracking of the feature points between the preceding image frame and the current image frame of the first view image is determined to be successful, the feature point determiner 320 may update sets of feature points based on corresponding feature points between the preceding image frame and the current image frame. Through such a temporal filtering or temporal matching, the first feature points corresponding to the feature points of the preceding image frame may be selected from among the feature points included in the current image frame of the first view image.

The feature point determiner 320 may select second feature points corresponding to feature points of the current image frame of the second view image from among the first feature points included in the current image frame of the first view image. Among the feature points included in the current image frame of the second view image, feature points corresponding to the second feature points of the first view image may be referred to as third feature points. For example, feature points whose L2 distance value between descriptors satisfies a desired (or alternatively, predetermined) reference among the first feature points and the second feature points, the feature point determiner 320 may determine the feature points to be corresponding feature points. Among the corresponding feature points, the feature point determiner 320 may use a fundamental matrix between the current image frame of the first view image and the current image frame of the second view image for determining the second feature points and the third feature points.

In an example, when the first feature points included in the current image frame of the first view image which are determined to be the inlier in the operation of the temporal matching are "$m_{L,i}^t$," the feature point determiner 320 may select feature points "$m_{R,i}^t$" having a descriptor with a smallest L2 distance with a descriptor of the $m_{L,i}^t$ from among the feature points included in the current image frame of the second view image.

Subsequently, the feature point determiner 320 may determine the fundamental matrix between the current image frame of the first view image and the current image frame of the second view image based on the $m_{L,i}^t$ of the first view image and the $m_{R,i}^t$ of the second view image. For example, the feature point determiner 320 may calculate the fundamental matrix between the current image frame of the first view image and the current image frame of the second view image based on Equation 3. When corresponding feature points between the current image frame of the first view image and the current image frame of the second view image with a highest inlier value through a random sample consensus (RANSAC) method are "$p_{L,i}^t$" and "$p_{R,i}^t$," respectively, the $p_{L,i}^t$ may correspond to the second feature points included in the current image frame of the first view image, and the $p_{R,i}^t$ may correspond to the third feature points included in the current image frame of the second view image. The feature point determiner 320 may determine the $p_{L,i}^t$ and the $p_{R,i}^t$, and add the determined $p_{L,i}^t$ and the $p_{R,i}^t$ to a feature set.

In another example, the feature point determiner 320 may adjust a size of a feature set. Matched feature points between the image frames of the first view image and matched feature points between the first view image and the second view image may be stored in the feature set and thus, a number of the feature points to be stored in the feature set may increase in progress of an operation of matching feature points. To reduce (or alternatively, prevent) the size of the feature set from excessively increasing, the feature point determiner 320 may determine feature points to be excluded from the feature set based on a search region.

The feature point determiner 320 may filter the second feature points based on the search region, and determine feature points remaining subsequent to the filtering to be the feature points to be used for the image calibration. For example, the feature point determiner 320 may set the search region based on the second feature points, and maintain a second feature point with a greatest value of a score among the second feature points included in each search region, and exclude the remaining second feature points. The score may indicate a reliability value for a feature point when the feature point is extracted. A size of the search region may be predetermined, or adaptively determined based on a number of the second feature points determined in the current image frame of the first view image or distribution of the second feature points.

The feature point determiner 320 may filter the third feature points of the second view image corresponding to the second feature points of the first view image based on the search region, and determine third feature points remaining subsequent to the filtering to be the feature points to be used for the image calibration. Here, a size of the search region to be applied to the current image frame of the second view image may be equal to the size of the search region to be applied to the current image frame of the first view image.

For example, the feature point determiner 320 may perform local maximum detection using the search region on the second feature points $p_{L,i}^t$ included in the current image frame of the first view image and the third feature points $p_{R,i}^t$ included in the current image frame of the second view image. The local maximum detection may be used to reduce (or alternatively, prevent) overlapping of the feature points included in the existing feature set and feature points to be newly added to the feature set.

The feature point determiner 320 may add all the second feature points $p_{L,i}^t$ to the feature set, and select second feature points having a maximum score in the search region from among the second feature points included in the feature set. For example, when an index set of second feature points present in a search region with a radius r from a location of an i-th second feature point $p_{L,i}^t$ is "j," the feature point determiner 320 may perform the local maximum detection based on Equations 4 and 5.

$$G(p_i^t, p_j^t) = \begin{cases} 1, & s(p_i^t) < s(p_j^t) \\ 0, & \text{otherwise} \end{cases} \quad \text{[Equation 4]}$$

In Equation 4, "s(x)" denotes a score of a feature point x, and "G(x1, x2)" denotes a function that outputs a resulting value of 1 when x2 has a greater score than x1 and outputs a resulting value of 0 in other cases.

$$L(p_i^t) = \begin{cases} 1, & \sum_{j=1}^{J} G(p_i^t, p_j^t) = 0 \\ 0, & \text{otherwise} \end{cases} \quad \text{[Equation 5]}$$

In Equation 5, "$L(p_i^t)$" denotes a function that outputs a resulting value of 1 when a second feature point $p_i^t$ included in a search region has a greater score than another second feature point $p_j^t$ included in the search region, and outputs a result value of 0 in other cases.

The G(x1, x2) may have a resulting value of 1 or 0 based on Equation 4. When the feature point $p_i^t$ has a greatest score among the second feature points included in the search region, the $L(p_i^t)$ may have the resulting value of 1 and the feature point determiner 320 may determine the score of the second feature point $p_i^t$ to be a local maximum. The feature point determiner 320 may remove other second feature points in the search region, excluding the second feature point $p_i^t$, from the feature set.

The feature point determiner 320 may manage the feature set. For example, the feature point determiner 320 may add a new feature point to the feature set and remove an existing feature point from the feature set. The feature point determiner 320 may mitigate (or alternatively, prevent) the size of the feature set from excessively increasing by removing existing feature points from the feature set. When the size of the feature set increases, a newly added feature point may have less influence on the image calibration. Thus, the feature set may be configured in the form of a queue.

When the size of the feature set filtered through the local maximum detection becomes larger than a desired (or alternatively, predetermined) size, the feature point determiner 320 may remove most initially stored feature points from the feature set because the most initially stored feature points have a lowest probability to be used for the image calibration for the current image frame. In addition, after the temporal matching is performed, the feature point determiner 320 may decrease a score of feature points included in the feature set by a desired (or alternatively, predetermined) ratio, for example, 10%. Thus, a reliability of feature points extracted from a former image frame less associated with the current image frame may decrease.

The feature point determiner 320 may transmit, to the image calibrator 330, the feature points determined through the operations described in the foregoing and to be used for the image calibration.

The image calibrator 330 may perform the image calibration based on the second feature points of the first view image and the third feature points of the second view image. The image calibrator 330 may perform image rectification and then color correction based on a location relationship between such reference feature points. The reference feature points may indicate feature points such as the second feature points and the third feature points to be used for the image calibration. The image calibrator 330 may include a geometric calibrator 340 and a color corrector 350.

The geometric calibrator 340 may perform the image rectification based on location information of the reference feature points of the first view image and the second view image. For example, based on a fact that a corresponding feature point is present on an epipolar line in a different view image, the geometric calibrator 340 may change the current image frame of the second view image to reduce a vertical disparity between the current image frame of the first view image and the current image frame of the second view image through the image rectification that aligns epipolar lines to be horizontal between viewpoint images.

The geometric calibrator 340 may perform the image rectification using an image transform matrix based on epipolar geometry. A homography, which is a matrix indicating a linear transformation relationship to be established between 3D camera coordinates obtained by observing a point P at a location of an A viewpoint image and 3D camera coordinates obtained by observing the point P at a location of a B viewpoint image, may be used as the image transform matrix. The geometric calibrator 340 may determine a homography between the current image frame of the first view image and the current image frame of the second view image based on the location information of the reference feature points. The geometric calibrator 340 may adjust locations of pixels included in the current image frame of the second view image by applying the determined homography to the current image frame of the second view image.

For example, the geometric calibrator 340 may perform the image rectification based on location information of reference feature points $f_{L,i}^t$ and $f_{R,i}^t$ obtained through matching of feature points. Here, the $f_{L,i}^t$ and the $f_{R,i}^t$ indicate reference feature points determined in the current image frame of the first view image, and reference feature points determined in the current image frame of the second view image, respectively.

When feature points at which y coordinate values of the reference feature points $f_{L,i}^t$ and $f_{R,i}^t$ are adjusted and heights are matched to each other are "$f'_{L,i}^t$" and "$f'_{R,i}^t$," respectively, the $f_{L,i}^t$ and the $f_{R,i}^t$ may satisfy Equation 6, and the $f'_{L,i}^t$ and the $f'_{R,i}^t$ may satisfy Equation 7.

$$f_{L,i}^t F f_{R,i}^t = 0 \quad \text{[Equation 6]}$$

In Equation 6, "F" denotes a fundamental matrix.

$$f'_{L,i}^t[i] \times f'_{R,i}^t = 0 \quad \text{[Equation 7]}$$

In Equation 7, "[i]" denotes an i-th line of the matrix. A relationship between an original reference feature point and a reference feature point for which the image rectification is performed may be represented as Equation 8.

$$(H_L^G f_{L,i}^t)^T[i] \times (H_R^G f_{R,i}^t) = 0 \quad \text{[Equation 8]}$$

In Equation 8, "$H_L^G$" and "$H_R^G$" denote a first geometric homography and a second geometric homography, respectively.

In an example, the first geometric homography may be fixed to an identity matrix by setting the first view image to be identical to an original image to improve stability. The geometric calibrator 340 may calculate the second geometric homography $H_R^G$ based on Equation 9.

$$\begin{bmatrix} x_i & y_i & 1 & 0 & 0 & 0 & -x'_i x_i & -x'_i y_i & -x'_i \\ 0 & 0 & 0 & x_i & y_i & 1 & -y'_i x_i & -y'_i y_i & -y'_i \\ \cdots & \cdots & \cdots & \cdots & \cdots & \cdots & \cdots & \cdots & \cdots \\ x_n & y_n & 1 & 0 & 0 & 0 & -x'_n x_n & -x'_n y_n & -x'_n \\ 0 & 0 & 0 & x_n & y_n & 1 & -y'_n x_n & -y'_n y_n & -y'_n \end{bmatrix} \begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0 \quad \text{[Equation 9]}$$

In Equation 9, $x_i = x'_i = x(f_{R,i}^t)$ $y_i = y(f_{R,i}^t)$ and $y'_i = y(f_{L,i}^t)$ may be established. "h11" through "h33" denote elements of the second geometric homography $H_R^G$, and the geometric calibrator 340 may calculate the elements of the second geometric homography $H_R^G$ through a least-squares method. The geometric calibrator 340 may perform the image rectification by applying the second geometric homography $H_R^G$ to the current image frame of the second view image.

In Equation 10, "xi" and "yi" denote x coordinate values and y coordinate values, respectively, of an i-th pixel among all pixels included in the current image frame of the second view image. "H" denotes a second geometric homography to be applied to the current image frame of the second view image. "x'i" and "y'i" denote x coordinate values and y coordinate values, respectively, of the i-th pixel adjusted by applying the second geometric homography H.

$$\begin{bmatrix} x'_1 & y'_1 & 1 \\ x'_2 & y'_2 & 1 \\ \vdots & \vdots & \vdots \\ x'_n & y'_n & 1 \end{bmatrix} = H \begin{bmatrix} x_1 & y_1 & 1 \\ x_2 & y_2 & 1 \\ \vdots & \vdots & \vdots \\ x_n & y_n & 1 \end{bmatrix} \quad \text{[Equation 10]}$$

A difference in the y coordinate values between corresponding pixels in the current image frame of the first view image and the current image frame of the second view image may be reduced (or alternatively, minimized) through the second geometric homography.

After the image rectification is performed, the color corrector 350 may perform color correction to reduce a difference in a color between viewpoint images. In an example, the color corrector 350 may adjust a color value of the current image frame of the second view image based on a color value of the current image frame of the first view image using the least-squares method. The color corrector 350 may minimize the difference in the color between the corresponding pixels between the current image frame of the first view image and the current image frame of the second view image based on the reference feature points.

The color corrector 350 may determine a color transform matrix using the difference in the color between pixels included in the current image frame of the first view image and pixels included in the current image frame of the second view image, and adjust a color of the current image frame of the second view image by applying the determined color transform matrix to the current image frame of the second view image.

For example, the color corrector 350 may determine a homography HP between the current image frame of the first view image and the current image frame of the second view image using the reference features $f_{L,i}{}^t$ and $f_{R,i}{}^t$, which are adjusted by performing the geometric calibration. The HP to be used for the color correction may be referred to as a photometric homography, and the color corrector 350 may calculate the photometric homography HP based on Equation 10. In Equation 10, "h11" through "h33" denote elements of the photometric homography HP.

The color corrector 350 may warp the current image frame of the second view image by applying an inverse function of the HP to the current image frame of the second view image, and determine the color transform matrix based on color information, for example, a red, green, and blue (RGB) value, of pixels included in an overlapping region between the current image frame of the first view image and the warped current image frame of the second view image. For example, the color corrector 350 may determine the color transform matrix "T" based on Equation 11.

$$\begin{bmatrix} R^R_{(1,1)} & G^R_{(1,1)} & B^R_{(1,1)} \\ R^R_{(1,2)} & G^R_{(1,2)} & B^R_{(1,2)} \\ \vdots & \vdots & \vdots \\ R^R_{(h,w)} & G^R_{(h,w)} & B^R_{(h,w)} \end{bmatrix} T = \begin{bmatrix} R^L_{(1,1)} & G^L_{(1,1)} & B^L_{(1,1)} \\ R^L_{(1,2)} & G^L_{(1,2)} & B^L_{(1,2)} \\ \vdots & \vdots & \vdots \\ R^L_{(h,w)} & G^L_{(h,w)} & B^L_{(h,w)} \end{bmatrix}$$ [Equation 11]

In Equation 11, "$R_{(h,w)}{}^R$," "$G_{(h,w)}{}^R$," and "$B_{(h,w)}{}^R$" indicate a red (R) color value, a green (G) color value, and a blue (B) color value, respectively, of pixels of the current image frame of the second view image, which are included in the overlapping region. "$R_{(h,w)}{}^L$," "$G_{(h,w)}{}^L$," and "$B_{(h,w)}{}^L$" indicate an R color value, a G color value, and a B color value, respectively, of pixels of the current image frame of the first view image, which are included in the overlapping region. "h" and "w" are indices used to identify a location of a pixel including RGB sub-pixels.

The color corrector 350 may calculate the color transform matrix T based on Equation 11 using the least-squares method, and correct a color value of the current image frame of the second view image by applying the color transform matrix T to RGB values of all the pixels included in the current image frame of the second view image. Through such a color correction, a color disparity between the current image frame of the first view image and the current image frame of the second view image may be reduced.

The second view image for which the geometric calibration and the color correction are performed may be output from the image calibrating apparatus 300, and the calibrated second view image may be used along with the first view image to generate 3D contents such as a stereoscopic image.

Figure 4:
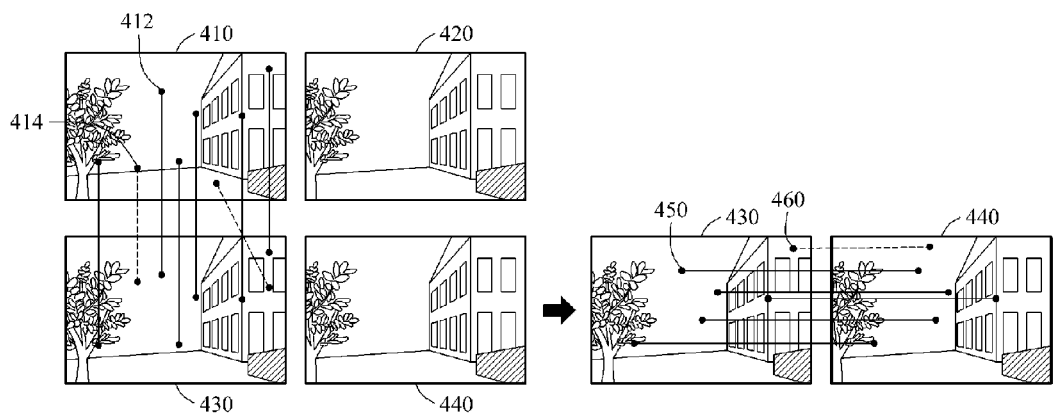
FIG. 4 illustrates an example of an operation of determining reference feature points according to at least one example embodiment.

FIG. 4 illustrates an example of an operation of determining reference feature points according to at least one example embodiment.

Referring to FIG. 4, an image frame 430 indicates a current image frame of a first view image, and an image frame 410 indicates a preceding image frame of the first view image. Similarly, an image frame 440 indicates a current image frame of a second view image, which corresponds to the image frame 430, and an image frame 420 indicates a preceding image frame of the second view image, which corresponds to the image frame 410.

An image calibrating apparatus may track corresponding feature points between the image frame 410 and the image frame 430 of the first view image. The image calibrating apparatus may select first feature points corresponding to feature points of the image frame 410 from among feature points extracted from the image frame 430. As illustrated in the example of FIG. 4, a solid line between feature points 412 indicates a case that matching of feature points between the image frame 410 and the image frame 430 is successful. Conversely, a broken line between feature points 414 indicates a case that matching of feature points is unsuccessful. In the example of FIG. 4, a total of eight feature points are extracted from the image frame 430, and only six feature points correspond to feature points of the image frame 410.

The image calibrating apparatus may determine whether the tracking of the feature points between the image frame 410 and the image frame 430 is successful using a fundamental matrix. When a number of corresponding feature points between the image frame 410 and the image frame 430 is greater than a desired (or alternatively, predetermined) number, the image calibrating apparatus may determine that the tracking of the feature points between the image frame 410 and the image frame 430 is successful. Conversely, when the number of the corresponding feature points between the image frame 410 and the image frame 430 is less than or equal to the desired (or alternatively, predetermined) number, the image calibrating apparatus may determine that the tracking of the feature points between the image frame 410 and the image frame 430 is a failure.

When the tracking of the feature points between the image frame 410 and the image frame 430 is determined to be a failure, the image calibrating apparatus does not consider the feature points extracted from the image frame 410, but calibrates the image frame 440 based on pairs of corresponding feature points between the image frame 430 and the image frame 440.

When the tracking of the feature points between the image frame 410 and the image frame 430 is determined to be successful, the image calibrating apparatus may determine a fundamental matrix between the image frame 410 and the image frame 430, and determine pairs of corresponding feature points between the image frame 410 and the image frame 430 based on the determined fundamental matrix.

When the first feature points corresponding to the feature points of the image frame 410 are selected from among the feature points extracted from the image frame 430, the image calibrating apparatus may filter the first feature points based on feature points extracted from the image frame 440, which is the current image frame of the second view image. The image calibrating apparatus may select second feature points corresponding to the feature points of the image frame 440 from among the first feature points selected in the image frame 430. The image calibrating apparatus may determine a fundamental matrix between the image frame 430 and the image frame 440, and determine pairs of corresponding feature points between the image frame 430 and the image frame 440 based on the determined fundamental matrix.

As illustrated in the example of FIG. 4, a solid line between feature points 450 indicates a case in which matching feature points between the image frame 430 and the image frame 440 is successful. A broken line between feature points 460 indicates a case that matching feature points is unsuccessful. In the example of FIG. 4, a total of six first feature points are selected in the image frame 430, and only five first feature points of the first feature points correspond to the feature points of the image frame 440 and are selected to be the second feature points.

The second feature points and third feature points corresponding to the second feature points among the feature points extracted from the image frame 440 may be used for image calibration. For example, the image calibrating apparatus may determine a homography between the image frame 430 and the image frame 440 based on location information of the second feature points of the image frame 430 and the third feature points of the image frame 440, and reduce a difference in an image height between the image frame 430 and the image frame 440 by applying the determined homography to the image frame 440.

Figure 5:
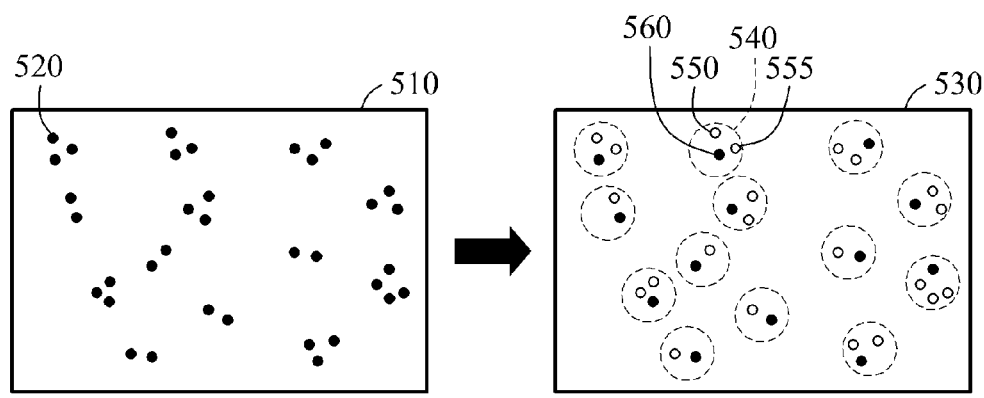
FIG. 5 illustrates an example of an operation of performing local maximum detection according to at least one example embodiment.

FIG. 5 illustrates an example of an operation of performing local maximum detection according to at least one example embodiment.

Feature points determined to correspond to one another in image frames of a first view image may be accumulated in a feature set, and a size of the feature set may gradually increase over time. An image calibrating apparatus may adjust a number of feature points to be used for image calibration through the local maximum detection to maintain a constant size of the feature set.

The image calibrating apparatus may filter second feature points of the first view image and third feature points of a second view image using a search region. In the example of FIG. 5, an operation of reducing a number of the second feature points included in a current image frame of the first view image by the image calibrating apparatus is also illustrated.

Referring to FIG. 5, the image calibrating apparatus sets a search region based on a location of each of second feature points 520 included in a current image frame 510 of a first view image, and select a feature point having a maximum score from the search region. A size of the search region may be based on empirical evidence and/or user defined. An image frame 530 indicates an image frame obtained by performing the local maximum detection on the image frame 510. For example, the image calibrating apparatus may determine, to be a local maximum, a second feature point 560 having a greatest score among second feature points, for example, a second feature point 550, a second feature point 555, and the second feature point 560, included in a search region 540, and exclude other second feature points 550 and 555 from a feature set, excluding the second feature point 560. Thus, only the second feature point 560 among the second feature points 550, 555, and 560 may be determined to be a reference feature point and used for the image calibration.

Figure 6:
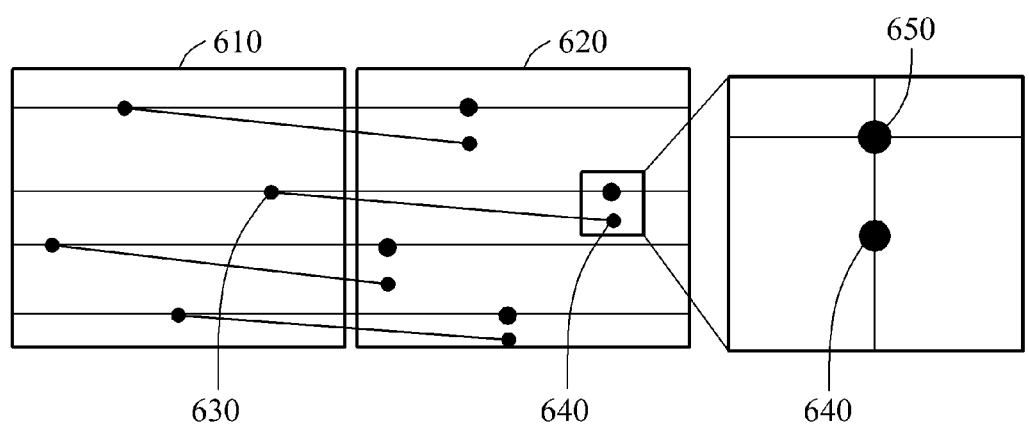
FIG. 6 illustrates an example of an operation of performing image rectification based on reference feature points according to at least one example embodiment.

FIG. 6 illustrates an example of an operation of performing image rectification based on reference feature points according to at least one example embodiment.

Referring to FIG. 6, an image frame 610 indicates a current image frame of a first view image, and an image frame 620 indicates a current image frame of a second view image. An image calibrating apparatus may adjust locations of pixels included in the image frame 620 based on reference feature points 630 selected in the image frame 610 and reference feature points 640 selected in the image frame 620. The reference feature points 630 and the reference feature points 640 may correspond to one another.

The image calibrating apparatus may perform homography-based image rectification on image coordinates. The image calibrating apparatus may determine a homography between the image frame 610 and the image frame 620 based on location information of the reference feature points 630 and the reference feature points 640. The image calibrating apparatus may adjust the locations of the pixels included in the image frame 620 by applying the determined homography to the image frame 620. For a detailed description, reference may be made to the description provided with reference to FIG. 3.

Lines passing each of the reference feature points 630 indicate epipolar lines, and the image calibrating apparatus may adjust 'y' location values of the pixels included in the image frame 620. For example, when the homography between the image frame 610 and the image frame 620 is applied to the image frame 620, a 'y' location of a reference feature point of the reference feature points 640 may be adjusted to a location 650.

Figure 7:
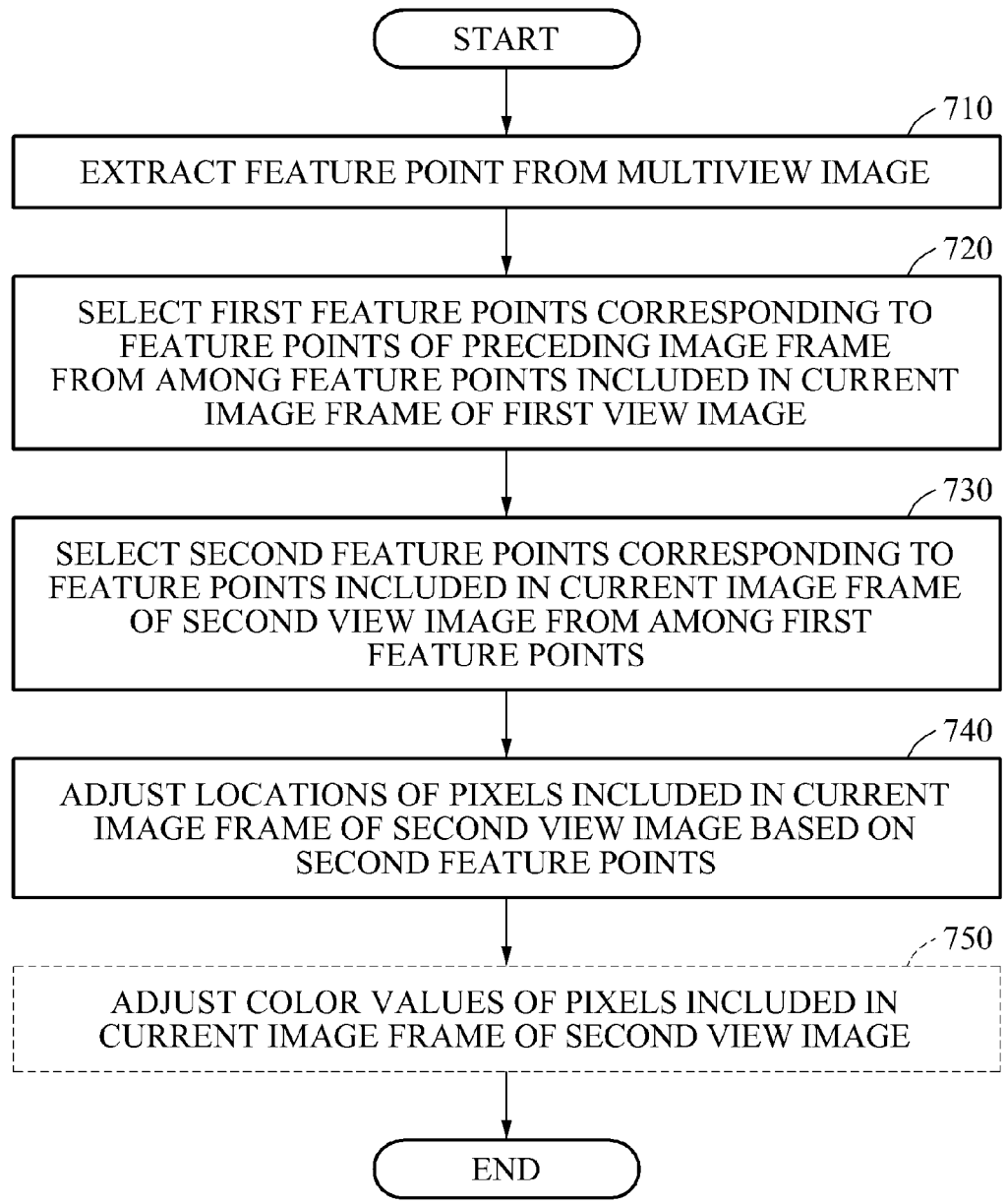
FIG. 7 is a flowchart illustrating a method of calibrating an image according to at least one example embodiment.

FIG. 7 is a flowchart illustrating a method of calibrating an image according to at least one example embodiment. The method of calibrating an image may be performed by an image calibrating apparatus.

Referring to FIG. 7, in operation 710, the image calibrating apparatus (e.g., image calibrating apparatus 300) extracts a feature point from a multiview image including a first view image and a second view image. For example, the image calibrating apparatus may extract the feature point from the multiview image using a Harris corner method, a SIFT method, or a FAST method.

In operation 720, the image calibrating apparatus selects first feature points corresponding to feature points of a preceding image frame from among feature points included in a current image frame of the first view image. Pairs of corresponding feature points between the current image frame and the preceding image frame of the first view image may be determined based on a difference in a descriptor. For example, feature points in which an L2 distance value between feature point descriptors satisfies a desired (or alternatively, predetermined) standard may be selected to be a pair of corresponding feature points from among the feature points of the current image frame and the preceding image frame of the first view image. Among the pairs of the feature points, the image calibrating apparatus may select the first feature points using a fundamental matrix between the current image frame and the preceding image frame of the first view image.

In operation 730, the image calibrating apparatus selects second feature points corresponding to feature points included in a current image frame of the second view image from among the first feature points determined in operation 720. For example, the image calibrating apparatus may select feature points in which an L2 distance value between feature point descriptors satisfies a desired (or alternatively, predetermined) standard to be pairs of corresponding feature points from among the first feature points and the feature points of the current image frame of the second view image. Among the pairs of the feature points, the image calibrating apparatus may select the second feature points using a fundamental matrix between the current image frame of the first view image and the current image frame of the second view image.

In operation 740, the image calibrating apparatus adjusts locations of pixels included in the current image frame of the second view image based on the second feature points of the first view image determined in operation 730. The image calibrating apparatus may determine a homography between the current image frame of the first view image and the current image frame of the second view image based on location information of the second feature points and third feature points corresponding to the second feature points among the feature points of the current image frame of the second view image, and adjust the locations of the pixels included in the current image frame of the second view image by applying the determined homography to the current image frame of the second view image.

The image calibrating apparatus may selectively perform operation 750. In operation 750, the image calibrating apparatus adjusts color values of the pixels included in the current image frame of the second view image. The image calibrating apparatus may estimate a color transform matrix using a difference in a color between pixels included in the current image frame of the first view image and the pixels included in the current image frame of the second view image. The image calibrating apparatus may adjust a color of the current image frame of the second view image by applying, to the current image frame of the second view image, the color transform matrix between the current image frame of the first view image and the current image frame of the second view image. Operation 750 will be described in further detail with reference to FIG. 9. For descriptions not provided with reference to FIG. 7, reference may be made to descriptions provided with reference to FIG. 3.

Although FIG. 7 illustrates an example of two different view images, a multiview image with three or more different views may be applied to the method of calibrating an image. For example, in a case of a multiview image with three different views, the image calibrating apparatus may select feature points corresponding to feature points included in a current image frame of a second view image from among first feature points of a first view image, and select feature points corresponding to feature points included in a current image frame of a third view image from among the first feature points of the first view image. Matching feature points between the first view image and the second view image, and matching feature points between the first view image and the third view image may be autonomously performed. Other operations may be identically performed to operations described with reference to FIGS. 3 and 7.

Figure 8:
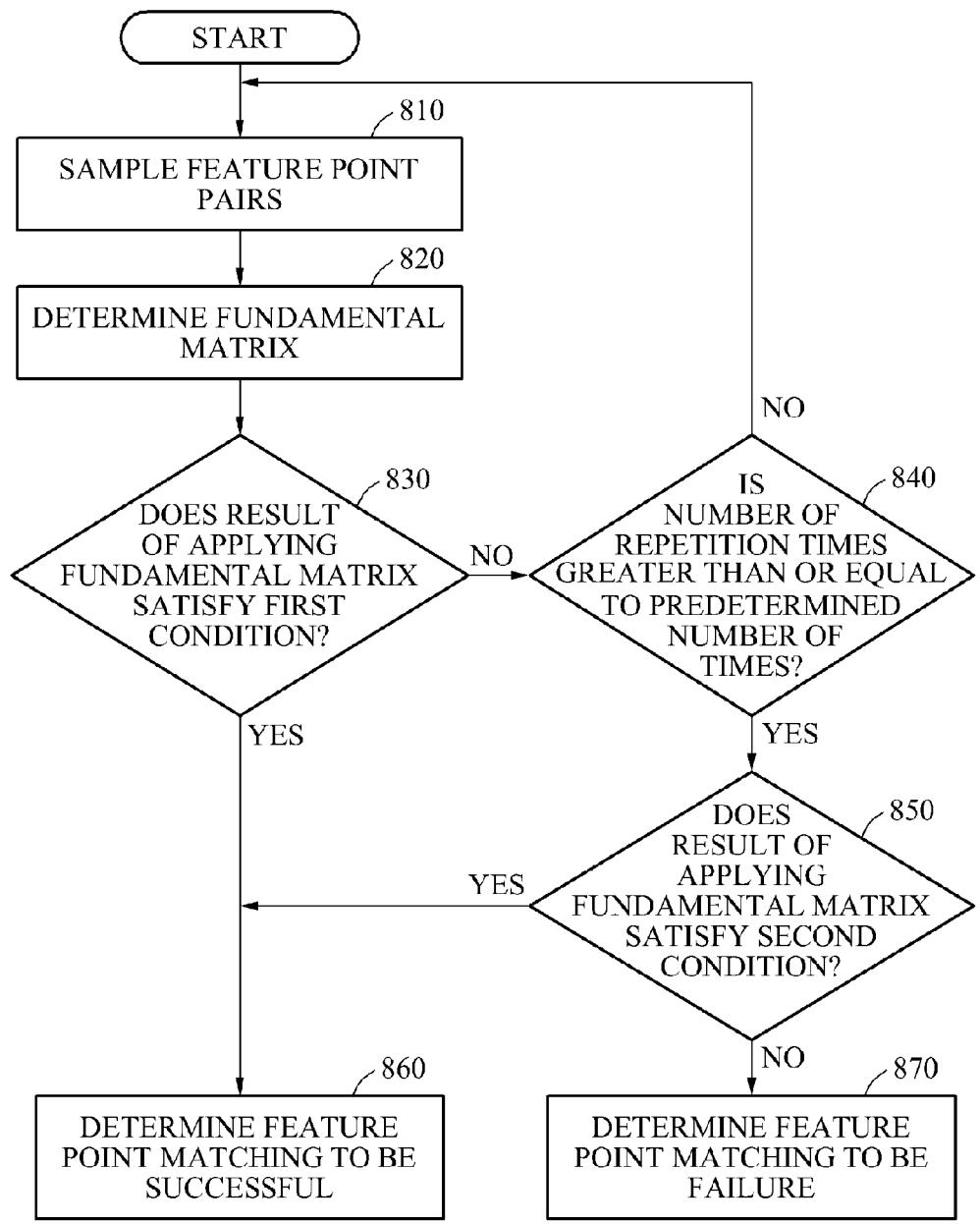
FIG. 8 is a flowchart illustrating a procedure of determining whether matching feature points is successful based on a fundamental matrix according to at least one example embodiment.

FIG. 8 is a flowchart illustrating a procedure of determining whether matching feature points is successful based on a fundamental matrix according to at least one example embodiment.

Referring to FIG. 8, in operation 810, an image calibrating apparatus (e.g., image calibrating apparatus 300) samples pairs of feature points determined to correspond to one another between a preceding image frame and a current image frame of a first view image. The image calibrating apparatus may randomly sample a desired (or alternatively, predetermined) number of pairs of feature points among the pairs of the feature points determined between the preceding image frame and the current image frame of the first view image.

In operation 820, the image calibrating apparatus determines a fundamental matrix between the preceding image frame and the current image frame of the first view image. The image calibrating apparatus may determine the fundamental matrix based on location information of the determined pairs of the feature points between the preceding image frame and the current image frame of the first view image. For example, the image calibrating apparatus may determine the fundamental matrix based on Equations 2 and 3 provided in the foregoing through a least-squares method.

In operation 830, the image calibrating apparatus determines whether a result of applying the fundamental matrix satisfies a first condition. For example, the image calibrating apparatus may determine a Sampson distance based on location information of each pair of the feature points and the fundamental matrix, and determine whether a ratio of feature points at which the Sampson distance is less than or equal to a certain distance satisfies a desired (or alternatively, predetermined) range.

In operation 840, when the result of applying the fundamental matrix does not satisfy the first condition, the image calibrating apparatus determines whether a number of repetition times is greater than or equal to a desired (or alternatively, predetermined) number of repetition times. For example, the image calibrating apparatus may determine whether the number of repetition times exceeds 10,000 times.

When the number of repetition times is less than the desired (or alternatively, predetermined) number of repetition times, the image calibrating apparatus may return to operation 810 and randomly sample a desired (or alternatively, predetermined) number of pairs of feature points among all pairs of feature points determined between the preceding image frame and the current image frame of the first view image. In operation 850, when the number of repetition times is greater than or equal to the desired (or alternatively, predetermined) number of repetition times, the image calibrating apparatus determines whether the result of applying the fundamental matrix satisfies a desired (or alternatively, predetermined) second condition.

In operation 860, when the result of applying the fundamental matrix satisfies the first condition or the second condition, the image calibrating apparatus determines that matching feature points between the preceding image frame and the current image frame of the first view image is successful. When the matching of the feature points is determined to be successful, the image calibrating apparatus may perform image calibration on a current image frame of a second view image based on a result of the matching. The first condition and the second condition may refer to the inlier ratios discussed with respect to FIG. 3.

In operation 870, when the result of applying the fundamental matrix does not satisfy the second condition in operation 850, the image calibrating apparatus determines that the matching of the feature points between the preceding image frame and the current image frame of the first view image is a failure. When the matching of the feature points is determined to be a failure, the image calibrating apparatus may determine that a scene change occurs in the current image frame of the first view image, and perform the image calibration without using the result of the matching. For example, the image calibrating apparatus does not consider the preceding image frame of the first view image, and performs the image calibration based on pairs of feature points determined by matching feature points between the current image frame of the first view image and the current image frame of the second view image.

Figure 9:
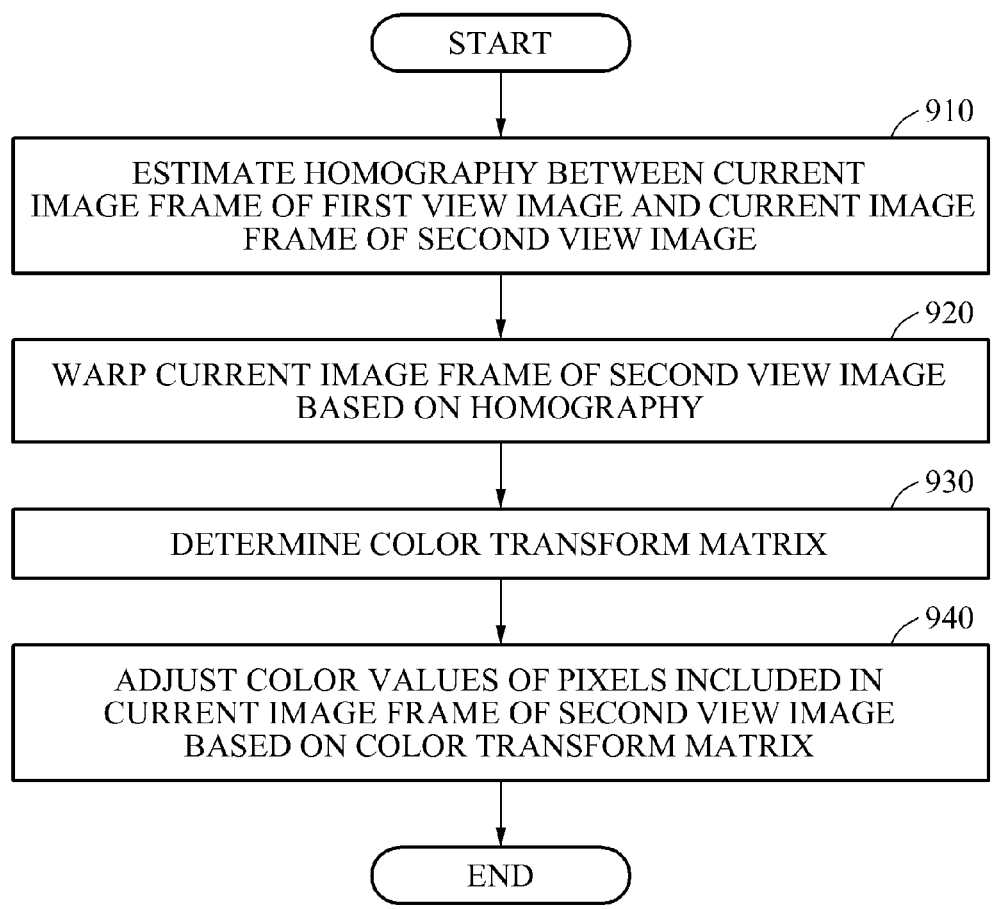
FIG. 9 is a flowchart illustrating a procedure of performing color correction according to at least one example embodiment.

FIG. 9 is a flowchart illustrating a procedure of performing color correction according to at least one example embodiment.

Referring to FIG. 9, in operation 910, an image calibrating apparatus (e.g., image calibrating apparatus 300) determines a homography between a current image frame of a first view image and a current image frame of a second view image. For example, the image calibrating apparatus may determine the homography between the current image frame of the first view image and the current image frame of the second view image based on Equation 9 provided in the foregoing.

In operation 920, the image calibrating apparatus warps the current image frame of the second view image based on the homography determined in operation 910. For example, the image calibrating apparatus may warp the current image frame of the second view image by applying an inverse function of the homography to the current image frame of the second view image.

In operation 930, the image calibrating apparatus determines a color transform matrix. The image calibrating apparatus may map the warped current image frame of the second view image to the current image frame of the first view image. The image calibrating apparatus may identify corresponding pixels between the current image frame of the second view image and the current image frame of the first view image to which the warped current image frame of the second view image is mapped, and determine the color transform matrix based on color information of the identified pixels. For example, the image calibrating apparatus may determine the color transform matrix based on Equation 11 provided in the foregoing and color information of pixels included in an overlapping region between the current image frame of the first view image and the warped current image frame of the second view image.

In operation 940, the image calibrating apparatus adjusts color values of the pixels included in the current image frame of the second view image based on the color transform matrix. The image calibrating apparatus may adjust the color values of the pixels included in the current image frame of the second view image by applying the color transform matrix to the current image frame of the second view image.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of calibrating an image, the method comprising:
   extracting feature points from a multiview image, the multiview image including a first view image and a second view image;
   selecting first feature points, corresponding to feature points of a preceding image frame of the first view image, from among feature points in a current image frame of the first view image as a temporal filtering;
   selecting second feature points, corresponding to feature points in a current image frame of the second view image, from among the first feature points as a spatial filtering after the temporal filtering; and performing image calibration on the current image frame of the second view image based on the second feature points.

2. The method of claim 1, wherein the selecting of the first feature points comprises:

determining pairs of corresponding feature points between the current image frame of the first view image and the preceding image frame of the first view image; and selecting the first feature points from among the pairs of the feature points using a fundamental matrix between the current image frame of the first view image and the preceding image frame of the first view image.

3. The method of claim 2, wherein the selecting of the first feature points comprises:

randomly selecting a number of pairs of feature points from among the selected pairs of the feature points; and determining the fundamental matrix based on location information of the selected number of pairs of the feature points.

4. The method of claim 2, wherein the selecting of the pairs of the feature points comprises:

determining the pairs of the feature points based on a difference in a feature point descriptor indicating a neighborhood property of a feature point.

5. The method of claim 1, wherein the performing of the image calibration comprises:

performing the image calibration on the current image frame of the second view image based on the second feature points and third feature points of the current image frame of the second view image corresponding to the second feature points.

6. The method of claim 5, wherein the performing of the image calibration comprises:

determining a homography between the current image frame of the first view image and the current image frame of the second view image based on location information of the second feature points and location information of the third feature points; and adjusting locations of pixels in the current image frame of the second view image by applying the homography to the current image frame of the second view image.

7. The method of claim 5, wherein the performing of the image calibration comprises:

filtering the second feature points based on a search region; and performing the image calibration on the current image frame of the second view image based on ones of the second feature points remaining after the filtering.

8. The method of claim 5, wherein the performing of the image calibration comprises:

adjusting vertical coordinate values of pixels in the current image frame of the second view image based on location information of the second feature points and location information of the third feature points.

9. The method of claim 1, further comprising:

adjusting color values of pixels in the current image frame of the second view image based on a homography between the current image frame of the first view image and the current image frame of the second view image.

10. The method of claim 9, wherein the adjusting of the color values comprises:

warping the current image frame of the second view image using the homography;

mapping the warped current image frame of the second view image to the current image frame of the first view image;

identifying corresponding pixels between the current image frame of the second view image and the current image frame of the first view image mapped with the current image frame of the second view image;

determining a color transform matrix based on color values of the identified pixels; and adjusting the color values of the pixels in the current image frame of the second view image by applying the color transform matrix to the current image frame of the second view image.

11. The method of claim 1, wherein the extracting of the feature points comprises:

downsampling the current image frame of the first view image; and extracting a feature point from the downsampled current image frame.

12. The method of claim 1, wherein the multiview image comprises a third view image.

13. A non-transitory computer-readable medium comprising program code that, when executed by a processor, performs the method of claim 1.

14. An apparatus for calibrating an image, the apparatus comprising:

a feature point extractor configured to extract feature points from a multiview image, the multiview image including a first view image and a second view image;

a feature point determiner configured to select feature points to be used for image calibration from a current image frame of the first view image and a current image frame of the second view image based on feature points in a preceding image frame of the first view image; and an image calibrator configured to perform the image calibration based on the selected feature points, wherein the feature point determiner is configured to perform a temporal filtering by selecting first feature points corresponding to the feature points of the preceding image frame from among feature points in the current image frame of the first view image, and perform a spatial filtering after the temporal filtering by selecting, as the feature points to be used for the image calibration, second feature points corresponding to feature points in the current image frame of the second view image from among the first feature points.

15. The apparatus of claim 14, wherein the feature point determiner is configured to determine pairs of corresponding feature points between the current image frame and the preceding image frame of the first view image, and select the first feature points from the pairs of the feature points using a fundamental matrix between the current image frame and the preceding image frame of the first view image.

16. The apparatus of claim 14, wherein the image calibrator comprises:

a geometric calibrator configured to adjust locations of pixels in the current image frame of the second view image based on location information of the feature points to be used for the image calibration.

17. The apparatus of claim 16, wherein the geometric calibrator is configured to determine a homography between the current image frame of the first view image and the current image frame of the second view image based on the location information of the feature points to be used for the image calibration, and adjust the locations of the pixels in the current image frame of the second view image by applying the homography to the current image frame of the second view image.

18. The apparatus of claim 14, wherein the image calibrator comprises:
   a color corrector configured to adjust color values of pixels in the current image frame of the second view image based on a homography between the current image frame of the first view image and the current image frame of the second view image.

19. The apparatus of claim 18, wherein the color corrector is configured to determine a color transform matrix based on the homography, and adjust color values of pixels in a current image frame of the second view image by applying the color transform matrix to the current image frame of the second view image.

20. An apparatus for calibrating a multiview image including a first view image and a second view image, the apparatus comprising:
   a feature point determiner configured to,
      perform a temporal filtering operation on a current frame of the first view image by matching feature points of the current frame of first view image with feature points of a preceding frame of the first view image to generate first matched feature points, and
      perform a spatial filtering operation on a current frame of the second view image by matching the first matched feature points with feature points of the current frame of the second view image to generate second matched feature points after the temporal filtering operation; and
   an image calibrator configured to calibrate the multiview image based on the second matched feature points.

21. The apparatus of claim 20, wherein the feature point determiner is configured to perform the matching in the temporal filtering operation by,
   determining pairs of feature points between the current frame of the first view image and the preceding frame of the first view image, and
   selecting feature points from the pairs of feature points using a fundamental matrix between the current frame of the first view image and the preceding frame of the first view image.

22. The apparatus of claim 20, wherein the image calibrator includes:
   a geometric calibrator configured to adjust locations of pixels in the current frame of the second view image based on location information of the second matched feature points.

23. The apparatus of claim 22, wherein the geometric calibrator is configured to determine a homography between the current frame of the first view image and the current frame of the second view image based on the location information of the second matched feature points, and adjust the locations of the pixels in the current frame of the second view image using the homography.

24. The apparatus of claim 20, wherein the image calibrator includes:
   a color corrector configured to adjust color values of pixels in the current frame of the second view image based on a homography between the current frame of the first view image and the current frame of the second view image.

25. The apparatus of claim 24, wherein the color corrector is configured to determine a color transform matrix based on the homography, and adjust color values of pixels in the current frame of the second view image using the color transform matrix.

* * * * *